United States Patent Office 3,806,523
Patented Apr. 23, 1974

3,806,523
3-ACYLOXY-3-(3'-LOWER CARBOALKOXY-4'-HYDROXY - 1'-NAPHTHYL)NAPHTHALIDE - 1,8 AND A PROCESS FOR ITS PREPARATION
Yunn H. Chiang, Woburn, Mass., assignor to Polaroid Corporation, Cambridge, Mass.
No Drawing. Filed Dec. 11, 1972, Ser. No. 314,098
Int. Cl. C07d 7/06
U.S. Cl. 260—343.2 R    12 Claims

ABSTRACT OF THE DISCLOSURE

This invention relates to 3-acyloxy-3-(3'-lower carboalkoxy-4'-hydroxy-1'-naphthyl)naphthalides useful as intermediates in the synthesis of 1-naphthol naphthalide indicator dyes and to the preparation of the naphthalide intermediates.

BACKGROUND OF THE INVENTION (1) Field of the invention

This invention relates to novel compounds and to the synthesis thereof. In particular, it relates to certain derivatives of 3-(4'-hydroxy-1'-naphthyl)naphthalides useful as intermediates in the synthesis of 1-naphthol naphthalide indicator dyes.

(2) Description of the prior art

Copending U.S. patent application Ser. No. 103,865 of Myron S. Simon filed Jan. 4, 1971 discloses and claims certain indicator dyes derived from 1-naphthols which find particular utility as optical filter agents in photographic processes for protecting an exposed photosensitive material from post-exposure fogging during development in the presence of incident light. Specifically, the 1-naphthol indicator dyes disclosed therein comprises 3,3-disubstituted phthalides and naphthalides wherein the 3,3 substituents are 4'-hydroxy-1'-naphthyl radicals at least one and preferably both of which possess a hydrogen-bonding group, such as, a carboxy, hydroxy, sulfonamido or sulfamoyl group substituted on a carbon atom adjacent to the 4'-hydroxy group. Among such dyes are phthalides and naphthalides wherein one or both of the 4'-hydroxy-1'-naphthyl radicals are substituted with a carboxy group in the 3'-position and which additionally may be substituted with an immobilizing group to render the dye substantially non-diffusible in a given photographic processing composition.

One method found particularly useful in preparing the latter naphthalide dyes forms the subject matter of copending U.S. patent application Ser. No. 314,097 of Yunn H. Chiang and John W. Sparks filed concurrently herewith. In the method disclosed and claimed therein, a monoester of a 3-hydroxy-3-(3'-carboalkoxy-4'-hydroxy-1'-naphthyl)naphthalide is utilized as the intermediate for reaction with a 2-carboxy-1-naphthol. In a preferred embodiment, the method comprises reacting a 3-acetoxy-3-3 - carboalkoxy-4'-hydroxy-1'-naphthyl)naphthalide and the selected naphthol in the presence of a catalytic amount of base to form the corresponding 3-(3'-carboalkoxy-4'-hydroxy - 1' - naphthyl)-3-(3"-carboxy-4"-hydroxy-1"-naphthyl)napthalide dye precursor. The carboalkoxy group of the dye precursor is then converted to a carboxy group to yield the corresponding indicator dye product. In a particularly preferred embodiment, the 2-carboxy-1-naphthol reacted with the monoacetate intermediate contains an aliphatic substituent that may be used to adjust the mobility characteristics of the dye product in a particular medium.

The present invention is concerned with monoesters, such as, the monoacetate intermediates employed in the aforementioned method and with the synthesis thereof.

SUMMARY OF THE INVENTION

It is the primary object of the present invention to provide novel monoesters of 3-hydroxy-3-(4'-hydroxy-1'-naphthyl)naphthalides.

It is another object of the present invention to provide novel monoesters useful as intermediates in the synthesis of 1-naphthol naphthalide indicator dyes.

It is a further object of the present invention to provide a method of preparing such monoesters.

Other objects of this invention will in part be obvious and will in part appear hereinafter.

According to the present invention, there is provided a novel class of monoesters, namely, 3-acyloxy-3-(4'-hydroxy-1'-naphthyl)naphthalides and a method of synthesizing them by reacting a 3-hydroxy-3-(4'-hydroxy-1'-naphthyl)naphthalide and an acid anhydride under certain specific conditions.

The invention accordingly comprises the processes involving the several steps and the relation and order of one of more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

DESCRIPTION OF THE PREFERRED EMBODIMENTS

It has been found quite unexpectedly that 3-acyloxy-3-(4'-hydroxy-1'-naphthyl)naphthalides may be prepared by heating a 3-hydroxy-3-(4'-hydroxy-1'-naphthyl)naphthalide and an acid anhydride in an inert organic solvent, provided the reaction is conducted in the absence of a strong acid or a base. Also, it has been found that under these conditions, the 3-acyloxy monoester is formed as the sole product of the reaction and is consistently obtained in substantially quantitative yields.

Though the present method may be employed in the preparation of 3-acyloxy naphthalides wherein the 4'-hydroxy - 1' - naphthyl radical is unsubstituted or substituted with various groups, it is particularly useful in preparing monoesters of 3-hydroxy - 3 - (3'-lower carboalkoxy - 4' - hydroxy - 1' - naphthyl)naphthalides. These preferred compounds produced according to the present invention may be represented by the following formula:

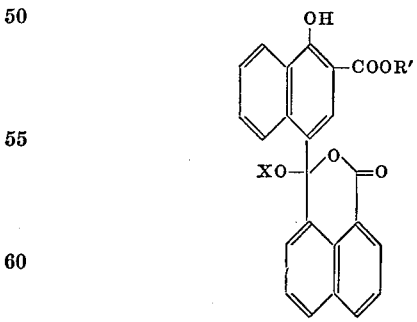

wherein X is an acyl radical of an organic di- or monocarboxylic acid having a pKa between about 2.5 and 5.0, aromatic or aliphatic including branched or straight chain saturated or unsaturated aliphatic acids and R' is lower alkyl containing 1 to 4 carbon atoms, e.g., ethyl, propyl, isopropyl, n-butyl, t-butyl, and preferably, methyl. Typical acyl radicals are those derived from acids, such as, benzoic acid, phthalic acid, isophthalic acid, cinnamic acid, α-naphthoic acid, β-naphthoic acid, acetic acid, butyric acid, caproic acid, capric acid, malonic acid, glutaric acid, sebacic, acrylic acid, crotonic acid, vinylacetic acid, methacrylic acid, maleic acid, fumaric acid, muconic acid and so forth. The acid may be unsubstituted or substituted with, for example, halo, nitro, cyano, lower alkyl, lower alkoxy, acetyl, phenyl, phenyl substituted with methoxy, nitro, halo or cyano, phenoxy and phenoxy substituted with nitro, halo or cyano. In a particularly preferred embodiment, the monoester intermediates are

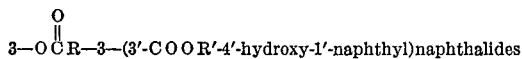

3—OCR—3—(3'-COOR'-4'-hydroxy-1'-naphthyl)naphthalides wherein R is an alkyl group containing 1 to 10 carbon atoms, particularly unsubstituted and mono-substituted alkyl derived from a saturated aliphatic monocarboxylic acid, RCOOH.

In preparing these compounds according to the method of the present invention, the acid anhydride employed as the acylating reagent is reacted with a 3-hydroxy-3-(3'-lower carboalkoxy - 4' - hydroxy - 1' - naphthyl)naphthalide in a molar ratio of about 1 to 10 moles of acid anhydride per mole of naphthalide. The reaction may be conducted in any inert organic liquid which is a solvent for the reactants. Particularly useful solvents are glacial acetic acid and aromatic hydrocarbons, such as, benzene, xylene and toluene. The reaction temperature may vary between about 20° and 200° C., and for achieving practical reaction times of about two hours, usually ranges between about 100° and 150° C.

As noted above, to obtain the desired monoester product, the reaction should be conducted in the absence of a base or a strong acid as commonly used to catalyze acylation reactions. When such materials are excluded from the reaction, the 3-acyloxy monoester is formed exclusively as the sole product of the reaction rather than a mixture of monoester isomers and diesters as would be expected. In the presence of an acylation catalyst, both hydroxy groups of the starting naphthalide, i.e., both the 3-hydroxy and 4'-hydroxy groups would be acylated to yield the diester.

The subject monoesters may be recovered from the reaction mixture in any suitable and convenient manner. Ordinarily, the monoester which precipitates out of the reaction mixture is collected by filtration after adding a diluent. For easy separation of the monoester product from the acid anhydride starting material, the diluent employed preferably is one in which the acid anhydride is substantially insoluble. Useful diluents include aliphatic or aromatic hydrocarbons or mixtures of aliphatic and aromatic hydrocarbons, for example, hexane-toluene and ligroin-benzene.

The acid anhydride employed for reaction with the naphthalide starting material should be selected to provide the desired acyl radical

of the acyloxy group

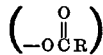

and may be the anhydride, preferably the symmetrical anhydride of an aromatic or aliphatic acid, such as, those mentioned above. Preferably, it is an anhydride, (RCO)$_2$O of a saturated aliphatic monocarboxylic acid wherein R is an alkyl group containing 1 to 10 carbon atoms, particularly unsubstituted and monosubstituted alkyl. Illustrative compounds include the anhydrides of the following acids: Acetic; acetoacetic; acrylic; anisic; m-β-anisylpropionic; benzoic; bromoacetic; o-bromobenzoic; m-bromobenzoic; γ-bromobutyric; n-butyric; iso-butyric; n-caproic; iso-caproic; chloroacetic; o-chlorobenzoic; m-chlorobenzoic; p-chlorobenzoic; α-chlorobutyric; β-chlorobutyric; γ-chlorobutyric; o-chlorophenoxyacetic; o-chlorophenylacetic; β - (o - chlorophenyl)propionic; α-chloropropionic; β-chloropropionic; crotonic; cyanoacetic; γ-cyanobutyric; o-cyanophenoxyacetic; m - cyanophenoxyacetic; diphenylacetic; ethylbenzoic; ethylphenylacetic; fluoroacetic; fluorobenzoic; γ-fluorobutyric; β-fluoropropionic; heptanoic; hexanoic; iodoacetic; o-iodobenzoic; m-iodobenzoic; β - iodopropionic; 2 - methyl - (cis) - 2-butenoic; methacrylic; methoxyacetic. β-methylvaleric; α-naphthoic; β-naphthoic; o-nitrobenzoic; p-nitrobenzoic; o-nitrophenylacetic; m-nitrophenylacetic; o-β-nitrophenylpropionic; p-β-nitrophenylpropionic; nonanic; octanoic; phenoxyacetic; phenylacetic; o-phenylbenzoic; γ-phenylbutyric; β-phenylpropionic; propionic; iso-propylbenzoic; o-toluic; m-toluic; p-toluic; trimethylacetic; n-valeric; iso-valeric; vinylacetic.

The aliphatic and the aromatic anhydrides can be prepared by the many methods known to the art, such as acylation of carboxylic acids by aryl halides, interaction of acyl halides and salts of carboxylic acids, interaction of acyl halides with acetic anhydride, etc. (cf. Romeo B. Wagner and Harry D. Zook, Synthetic Organic Chemistry, John Wiley & Sons, Inc., 1953, p. 558).

The 3-hydroxy-3-(3'-lower carboalkoxy-4'-hydroxy-1'-naphthyl)naphthalide employed as the starting material in the above reaction may be prepared by reacting the selected 2-lower-carboalkoxy-1-naphthol (i.e., 2-COOR'-1-naphthol wherein R' is lower alkyl as defined previously) and naphthalaldehydic acid in the presence of an acid catalyst to form the corresponding 1:1 naphthalidylnaphthol adduct. The adduct thus obtained may be oxidized with, for example, o-chloranil and the oxidation product hydrated to yield the corresponding 3-hydroxy-naphthalide, as described in copending U.S. patent application Ser. No. 108,662 of Alan L. Borror filed Jan. 21, 1971.

This starting material also may be prepared by other methods. For example, the 3-hydroxy-3-(3'-lower carboalkoxy - 4'-hydroxy-1'-naphthyl)naphthalide may be prepared by forming a complex solution of a 2-lower carboalkoxy-1-naphthol by reacting the naphthol with anhydrous aluminum chloride followed by the addition of solvent, such as, nitrobenzene and then reacting the complex solution with 3,3-dichloronaphthalide (naphthalyl dichloride). This reaction sequence is illustrated below:

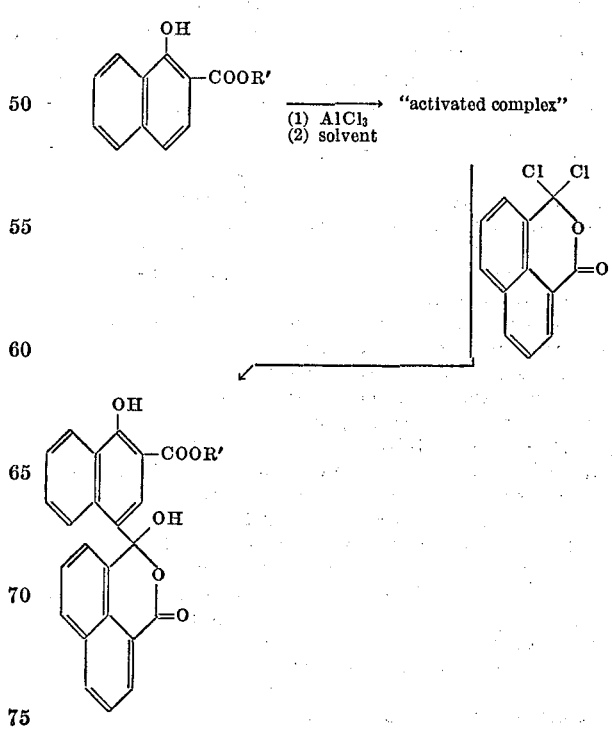

The further reaction of the 3-hydroxy-3-(3'-COOR'-4'-hydroxyl-1'-naphthyl)naphthalide and an acid anhydride, e.g., acetic anhydride, to yield the corresponding 3-acyloxy-3-(3'-COOR'-4'-hydroxy-1'-naphthyl)naphthalide according to the subject method is illustrated below:

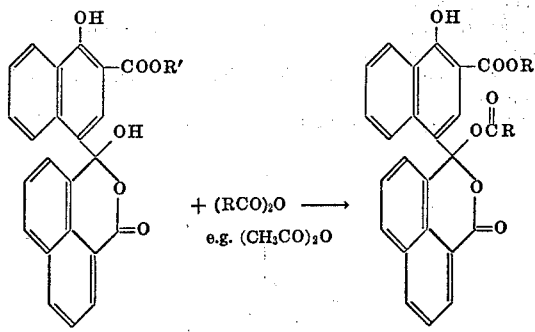

The following examples are given to further illustrate the present invention and are not intended to limit the scope thereof.

EXAMPLE 1

Preparation of 3-acetoxy-3-(3'-carbomethoxy-4'-hydroxy-1'-naphthyl)naphthalide

A mixture of 40.0 g. (0.1 mole) of 3-hydroxy-3-(3'-carbomethoxy-4'-hydroxy-1-naphthyl)naphthalide-1,8, 40 ml. of acetic anhydride (0.43 mole) and 60 ml. of glacial acetic acid was refluxed (~122° C.) for about 2 hours with moderate stirring under nitrogen atmosphere. A white solid precipitated out of the red homogeneous solution after approximately 12 minutes. The reaction mixtures was diluted with 200 ml. of a 35% solution of hexane in toluene (volume percent). After cooling the hexane-toluene suspension to room temperature, an additional 150 ml. of 35% hexane in toluene was added. The reaction mixture was cooled in a refrigerator (0° to 5° C.) overnight, filtered, washed with three 100 ml. portions of 35% solution of hexane in toluene and dried to give 42.7 g. (97% by weight yield), of the title compound as a snow-white solid, melting range 218–222° C. (dec.). Purity by high pressure liquid-liquid chromatography 97.3 to 100%.

EXAMPLE 2

Preparation of 3-acetoxy-3-(3'-carbomethoxy-4'-hydroxy-1'-naphthyl)naphthalide

To a refluxing mixture of 40.0 g. (0.1 mole) of 3-hydroxy - 3 - (3' - carbomethoxy-4'-hydroxy-1'-naphthyl) naphthalide-1,8 and 60 ml. of glacial acetic acid was added 40 ml. of acetic anhydride (0.43 mole) with moderate stirring under nitrogen atmosphere. A white solid precipitated out of the red homogeneous solution after approximately 5 minutes. After refluxing for 2 hours, the reaction mixture was diluted with 200 ml. of toluene. The reaction mixture was cooled in a refrigerator (0° to 5° C.) overnight, filtered, washed with three 100 ml. portions of toluene and dried to give 41.30 g. (93% by weight yield) of the title compound, as snow-white solid. Purity by high pressure liquid-liquid chromatography 97.3%.

EXAMPLE 3

Preparation of 3-monochloroacetoxy-3-(3'-carbomethoxy-4'-hydroxy-1'-naphthyl)naphthalide A mixture of 1.0 gram of 3-hydroxy-3-(3'-carbomethoxy-4'-hydroxy-1'-naphthyl)naphthalide-1,8, 3.0 grams of monochloroacetic anhydride and one ml. of toluene was stirred at 50° C. for 1½ hours under nitrogen. The purple solution was diluted with 5 ml. of toluene, causing crystallization of a white solid. After stirring overnight, the solid was filtered, washed with toluene and dried to yield 0.83 g. (71% by weight) of the title compound, melting point 176°–178° C.

EXAMPLE 4

Example 1 also was repeated using 20 ml. of acetic anhydride to give the title compound in a yield of 98% by weight and 97% purity.

The elemental analysis for the compound produced in Example 1 was as follows:

Calculated for $C_{26}H_{18}O_7$ (percent): C, 70.58. H, 4.10; O, 25.32. Found (percent): C, 70.70, 70.61; H, 4.13, 4.02; O, 25.50, 25.32.

An analysis of this compound based on n.m.r. also was made by measuring the chemical shift of the hydroxyl proton and comparing with the compounds designated B and C below and with the isomeric monoacetate designated D. The 3-acetoxy monoacetate product of Example 1 is designated A.

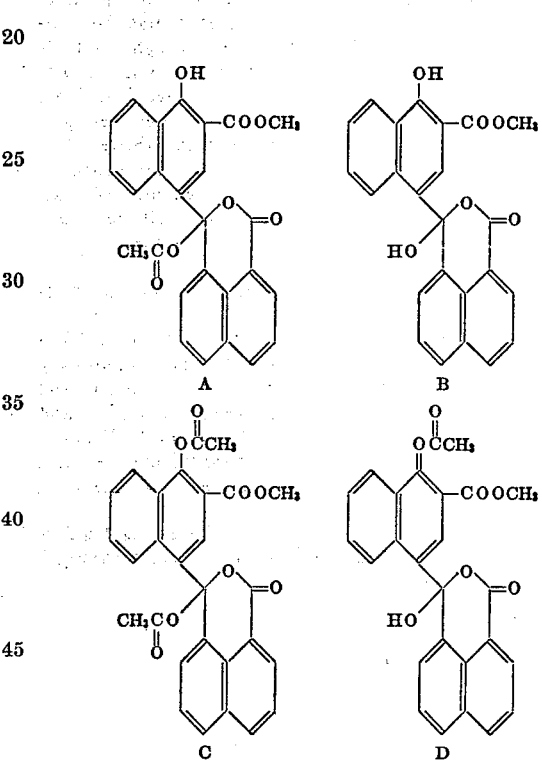

All spectra were run in a non-hydrogen-bonding solvent, $CD_3CN$. The hydroxyl group in the 4' position will hydrogen-bond to the carbonyl of the carbomethoxy in the 3' position, shifting its NMR absorption to low field. Since absorption peaks due to hydrogen-bonded hydroxyl groups were observed in the spectra of B and A at 13.02 p.p.m. and 13.10 p.p.m., respectively, and no peaks were observed down field of the aromatic region in the spectra of C and D, the structure assignment can be made unequivocally.

In a further analysis based on IR absorption, it was found that the absorption at 1780 cm.$^{-1}$, which is characteristic of a 4'-acetoxy group and which appears in the spectrum of Compound C, was absent from the spectrum of Compound A. Similar to C, Compound A gave a carbonyl absorption at 1740 cm.$^{-1}$ which corresponds to the 3-acetoxy absorption.

When heated in acetonitrile, acetic acid or benzene, the product of Example 1 gave a red-colored solution. It also reacted with triethylamine in methylene chloride to give a deep red color which is indicative of the presence of quinone methide, i.e., the structure:

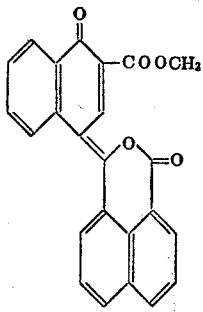

As mentioned previously, other inert reaction solvents may be substituted for those used in the specific examples and when employed in the isolation of the product from the reaction solution, other diluents may be substituted for the hexane-toluene mixture. Though conducting the reaction under an inert atmosphere is not essential, it is preferred, and rather than nitrogen, the inert atmosphere may be provided by argon or other inert gas.

Since certain changes may be made in the above products and processes without departing from the scope of the invention herein involved, it is intended that all matter contained in the above description shall be interpreted as illustrative and not in a limiting sense.

What is claimed is:

1. A process which comprises reacting (a) the symmetrical anhydride of an organic monocarboxylic acid having a pKa between about 2.5 and 5 and (b) a 3-hydroxy-3-(3' - lower carboalkoxy-4'-hydroxy-1'-naphthyl) naphthalide in a molar ratio of about 1–10:1 in an inert organic solvent at a temperature between about 100° and 150° C. to form the corresponding 3-acyloxy-3-(3'-lower carboalkoxy-4'-hydroxy-1'-naphthyl)naphthalide-1,8, said reaction being conducted in the absence of a base or a strong acid.

2. A process as defined in claim 1 wherein said anhydride is $(RCO_2)O$ and said R is an alkyl group having 1 to 10 carbon atoms.

3. A process as defined in claim 2 wherein said 3'-lower carboalkoxy is 3'-carbomethoxy.

4. A process as defined in claim 3 wherein said R is methyl.

5. A process as defined in claim 4 wherein said solvent is glacial acetic acid.

6. A process as defined in claim 3 wherein said R is monochloromethyl.

7. A process as defined in claim 6 wherein said solvent is toluene.

8. A compound of the formula:

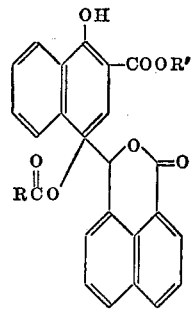

wherein R' is lower alkyl and R is an alkyl group.

9. A compound as defined in claim 8 wherein R' is methyl.

10. A compound as defined in claim 9 wherein R is methyl.

11. A compound as defined in claim 9 wherein R is monohalomethyl.

12. A compound as defined in claim 11 wherein R is monochloromethyl.

References Cited

Brusentsov et al.: Chemical Abstracts, vol. 72, abstract No. 43268x (1970).

JOHN D. RANDOLPH, Primary Examiner

M. A. M. CROWDER, Assistant Examiner